(12) United States Patent
Cameo et al.

(10) Patent No.: US 8,682,760 B2
(45) Date of Patent: Mar. 25, 2014

(54) METHODS AND DEVICES FOR SAVINGS PARTICIPATION

(75) Inventors: Valerie Felice Cameo, Chicago, IL (US); Todd C. Moning, Chaska, MN (US); Jeffrey D. Phillips, Raleigh, NC (US)

(73) Assignee: U.S. Bank National Association, Cincinnati, OH (US)

( * ) Notice: Subject to any disclaimer, the term of this patent is extended or adjusted under 35 U.S.C. 154(b) by 613 days.

(21) Appl. No.: 12/469,411

(22) Filed: May 20, 2009

(65) Prior Publication Data

US 2010/0299186 A1 Nov. 25, 2010

(51) Int. Cl.
*G06Q 40/00* (2012.01)

(52) U.S. Cl.
USPC .................. 705/35; 705/37; 705/38; 705/39; 705/40

(58) Field of Classification Search
USPC ..................................... 705/35–40
See application file for complete search history.

(56) References Cited

U.S. PATENT DOCUMENTS

| | | |
|---|---|---|
| 5,465,206 A | 11/1995 | Hilt et al. |
| 5,596,642 A | 1/1997 | Davis et al. |
| 5,596,643 A | 1/1997 | Davis et al. |
| 5,649,117 A | 7/1997 | Landry |
| 5,649,118 A | 7/1997 | Carlisle et al. |
| 5,650,604 A | 7/1997 | Marcous et al. |
| 5,717,989 A | 2/1998 | Tozzoli et al. |
| 6,070,150 A | 5/2000 | Remington et al. |
| 6,292,789 B1 | 9/2001 | Schutzer |
| 6,298,335 B1 | 10/2001 | Bernstein |
| 6,529,187 B1 | 3/2003 | Dickelman |
| 7,092,913 B2 | 8/2006 | Cannon, Jr. |
| 7,174,302 B2 | 2/2007 | Patricelli et al. |
| 7,280,981 B2 | 10/2007 | Huang et al. |
| 7,464,859 B1 | 12/2008 | Hawkins |
| 7,584,151 B2 | 9/2009 | Wells et al. |
| 7,590,557 B2 | 9/2009 | Harrison et al. |
| 7,627,523 B1 | 12/2009 | Symonds et al. |
| 7,661,586 B2 | 2/2010 | Robbins, Jr. et al. |
| 7,664,690 B2 | 2/2010 | Dirnberger et al. |

(Continued)

OTHER PUBLICATIONS

Account can help you save Vicki Lee Parker News & Observer Jan. 27, 2008.*

(Continued)

*Primary Examiner* — Williams Rankins
(74) *Attorney, Agent, or Firm* — Crawford Maunu PLLC (57) ABSTRACT

A computer-based automated savings method includes storing in a memory circuit, for each customer, customer profile data that identifies an account for accumulating automated savings, that identifies customer-specified types of financial transactions for automated savings participation, and that identifies a customer-specified saving algorithm for each of the different types of financial transactions. Notification data is received that is indicative of one of the customers having actively engaged in one of the types of financial transactions for automated savings participation. The customer's profile data in the memory circuit is accessed, the type of financial transaction being engaged in by the customer is compared with the customer-specified types of financial transactions, and therefrom it is determined whether the type of financial transaction qualifies for automated savings participation. The method further includes based upon the comparison, selecting a customer-specified saving algorithm as specified for the type of financial transaction, accessing and implementing the customer-specified saving algorithm for the financial transaction for which notification data has been received and, therefrom, increasing the amount of savings in the account for accumulating automated savings.

32 Claims, 3 Drawing Sheets

(56) References Cited

U.S. PATENT DOCUMENTS

| | | | |
|---|---|---|---|
| 7,680,679 B1 | 3/2010 | Patricelli et al. | |
| 7,702,530 B2 | 4/2010 | Pearson | |
| 7,702,553 B1 | 4/2010 | Dickelman | |
| 7,702,577 B1 | 4/2010 | Dickelman | |
| 7,711,621 B2 | 5/2010 | Huang et al. | |
| 7,725,391 B1* | 5/2010 | Ley et al. | 705/39 |
| 2001/0014878 A1 | 8/2001 | Mitra et al. | |
| 2002/0002495 A1 | 1/2002 | Ullman | |
| 2002/0111886 A1 | 8/2002 | Chenevich et al. | |
| 2002/0111915 A1 | 8/2002 | Clemens et al. | |
| 2002/0111916 A1 | 8/2002 | Coronna et al. | |
| 2002/0145051 A1 | 10/2002 | Charrin | |
| 2002/0184147 A1 | 12/2002 | Boulger | |
| 2003/0009382 A1 | 1/2003 | D'Arbeloff et al. | |
| 2003/0061147 A1 | 3/2003 | Fluhr et al. | |
| 2003/0061157 A1 | 3/2003 | Hirka et al. | |
| 2003/0225649 A1* | 12/2003 | Simpson | 705/35 |
| 2004/0024703 A1 | 2/2004 | Roskind | |
| 2004/0030657 A1 | 2/2004 | Holm-Blagg et al. | |
| 2004/0044621 A1 | 3/2004 | Huang et al. | |
| 2004/0080691 A1 | 4/2004 | Mi et al. | |
| 2004/0093302 A1 | 5/2004 | Baker et al. | |
| 2004/0222285 A1* | 11/2004 | Pohl | 235/379 |
| 2005/0038740 A1* | 2/2005 | Ogilvie | 705/40 |
| 2005/0060579 A1 | 3/2005 | Dickelman et al. | |
| 2005/0077350 A1 | 4/2005 | Courtion et al. | |
| 2005/0216399 A1* | 9/2005 | Colvin | 705/39 |
| 2005/0222961 A1 | 10/2005 | Staib et al. | |
| 2005/0267840 A1 | 12/2005 | Holm-Blagg et al. | |
| 2006/0089906 A1 | 4/2006 | Rowley | |
| 2006/0116957 A1 | 6/2006 | May et al. | |
| 2007/0033134 A1* | 2/2007 | Carretta et al. | 705/38 |
| 2007/0038577 A1 | 2/2007 | Werner et al. | |
| 2007/0057036 A1* | 3/2007 | Santa Cruz et al. | 235/380 |
| 2007/0080213 A1* | 4/2007 | Workman et al. | 235/380 |
| 2007/0106581 A1* | 5/2007 | Mitchell et al. | 705/35 |
| 2007/0282743 A1 | 12/2007 | Lovelett et al. | |
| 2007/0294166 A1* | 12/2007 | Cello | 705/40 |
| 2008/0046358 A1 | 2/2008 | Holm-Blagg et al. | |
| 2008/0103985 A1 | 5/2008 | Huang et al. | |
| 2008/0275748 A1 | 11/2008 | John | |
| 2008/0306838 A1 | 12/2008 | Fleet et al. | |
| 2008/0307034 A1 | 12/2008 | Fleet et al. | |
| 2009/0030848 A1 | 1/2009 | Wendel | |
| 2009/0063332 A1* | 3/2009 | Tabaczynski et al. | 705/39 |
| 2009/0150286 A1* | 6/2009 | Barton | 705/44 |
| 2009/0275399 A1* | 11/2009 | Kelly et al. | 463/27 |

OTHER PUBLICATIONS

Shop and save (for college). (Eye on the Web). Grocery Headquarters, 68, 11, 10(1) Nov. 2002.*

Country Survey—US: Profits grow, but charge-offs bite Anonymous Cards International, p. 10-13, Apr. 26, 2006.*

* cited by examiner

Customer #N

Customer #2

Customer #1: Accumulated Savings Account # xxxxxxxxx

| Accounts | Transaction Types for Savings Participation | Savings Algorithms | |
|---|---|---|---|
| -Checking Account # 5001 | -Debit Card Purchases<br>-ATM withdrawals<br>-Checks<br>-Online Bill Pay | -2% of purchase amount<br>-$5 per withdrawal<br>-Default<br>-1% of transaction amount | |
| -Savings Account # 5002 | -ATM withdrawals<br>-Deposits | -$5 per withdrawal<br>-$10 per deposit | |

FIG. 3

METHODS AND DEVICES FOR SAVINGS PARTICIPATION

FIELD OF THE INVENTION

The present invention relates to integrated financial network systems and more particularly pertains to an automatic logic program that causes an accumulation of customer savings via a contribution system for automatically directing or contributing monies to customers' savings accounts in response to financial transactions or by depositing money into an account.

BACKGROUND

With the economy facing problems and doubts regarding the funding of government-sponsored retirement plans, there is an ever increasing need for individuals to shed debts and increase their savings goals. For the vast majority of consumers, research shows that periodic savings efforts, in the midst of current spending needs and habits, are insufficient to sustain any significant accumulation of savings.

There have been many previous attempts to use integrated financial network systems as a tool for helping individuals save, for example, known integrated financial network systems having included savings programs based on systems of creating excess funds from spending transactions. In such systems, consumers can tender an excess payment to a payee that they have an existing account with (e.g. utility and gas companies) and allow the excess funds to stay with the payee for the payment of future services or direct the payee to distribute the excess funds to an outside provider, such as a charitable (nonprofit) entity. The payee provides an active role as to account management and selection/distribution of the excess funds for internal purposes, as well as to outside providers. In a related system, consumers create excess funds when the face amount paid to a payee is in excess of the purchase price. In addition to the requirement for an excess payment, there is also the need for the payee to process the transaction by subtracting the amount of the purchase price from the amount tendered. In yet another known Point-of-Sale ("POS" retail) system, savings is based on an accumulation of credits in a customer's surplus accounts from financial transactions between the customer and a retailer. In this context, when the customer makes a purchase, the retailer demands an amount due typically at a POS station controlled by the retailer. In response to the customer engaging in a conventional credit/debit transaction and also entering an additional amount into the POS station, the additional amount is reported to the customer's bank where the selected amount is transferred from the customer's credit/debit account to the customer's savings account at the bank. Such systems provide the consumer with limited opportunities and incentives to create excessive funds and/or to determine the application of said funds, or require the payee to become actively involved on a transaction-by-transaction basis in determining when and how much to save.

Accumulating real savings requires incredible discipline or another approach altogether.

SUMMARY

Aspects of the present invention are exemplified in a number of illustrated implementations and applications, some of which are shown in the figures and characterized in the claims section that follows. Certain embodiments of the present invention are directed to automated savings methods and circuits that enable customers of a financial institution to control the manner in which they accumulate savings.

According to one specific embodiment of the present invention, a computer-based automated savings method is implemented by a computer on behalf of a financial institution. The method includes, storing in a memory circuit, for each of a plurality of customers, customer profile data that identifies an account for accumulating automated savings, that identifies customer-specified types of financial transactions for automated savings participation, and that identifies a customer-specified saving algorithm for each of the different types of financial transactions. The method further includes receiving notification data indicative of one of the customers having actively engaged in one of the types of financial transactions for automated savings participation. In response to receipt of the notification data, the method includes accessing the customer's profile data in the memory circuit, comparing the type of financial transaction being actively engaged by the customer with the customer-specified types of financial transactions, and determining therefrom whether the type of financial transactions qualifies for automated savings participation. The method further includes, based upon the comparison, selecting a customer-specified saving algorithm as specified for the type of financial transaction, accessing and implementing the customer-specified saving algorithm for the financial transaction for which notification data has been received, and, therefrom, increasing the amount of savings in the account for accumulating automated savings.

According to another embodiment of the present invention, a data-storage medium is provided that contains computer-executable data that, in response to being executed by a computer circuit, causes the computer circuit to execute the steps of the above described method.

According to a further embodiment of the present invention, a computer-based circuit is provided that is operable on behalf of a financial institution for accumulating savings on behalf of an individual. The computer-based circuit includes a memory circuit storing, for each of a plurality of customers, customer profile data that identifies an account for accumulating automated savings, that identifies customer-specified types of financial transactions for automated savings participation, and that identifies a customer-specified saving algorithm for each of the different types of financial transactions. The computer-based circuit further includes a network-interface circuit configured to receive notification data, from a customer-oriented terminal, indicative of one of the customers having actively engaged in one of the types of financial transactions for automated savings participation. The computer-based circuit further includes a computer arrangement, including at least one software-programmed computer, configured for the customer, to access the customer profile data in the memory circuit, to compare the type of financial transaction being actively engaged in by the customer with the customer-specified types of financial transactions, and to determine therefrom whether the type of financial transaction qualifies for automated savings participation. The computer arrangement is further configured, based upon the comparison, to select a customer-specified saving algorithm as specified for the type of financial transaction, to access and implement the customer-specified saving algorithm for the type of financial transaction, and therefrom to increase the amount of savings in the account for accumulating automated savings.

The above summary is limited to characterizing certain aspects and is not intended to describe each illustrated embodiment or every implementation of the present invention. The figures and detailed description that follow, including that described in the appended claims, more particularly exemplify these embodiments.

BRIEF DESCRIPTION OF THE DRAWINGS

The invention may be more completely understood in consideration of the detailed description of various embodiments of the invention that follows in connection with the accompanying drawings as follows.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for certain computer-implemented circuits which automatically accumulates money into an individual's savings account, in response to a financial transaction, according to a previously-determined algorithm as specified by a cooperative arrangement between the individual and the individual's financial institution, e.g., when setting up the individual's savings account. Implementations of the present invention have been found to be particularly advantageous for operation by banks where customers prefer to control the manner in which they accumulate savings, such as based on the type of financial transaction they might initiate. While the present invention is not necessarily limited to such applications, various aspects of the invention may be appreciated through a discussion of various examples using this context.

As a first example, an embodiment of the present invention is directed to a computer-based circuit operable on behalf of a financial institution for accumulating savings on behalf of an individual. The computer-based circuit includes a network-interface circuit, a computer arrangement, and a memory circuit for managing and accessing a database relevant to the customer account types and specifications for customer-specified operations. The memory circuit stores, for each of a plurality of customers: customer profile data that identifies an account for accumulating automated savings, that identifies customer-specified types of financial transactions for automated savings participation, and that identifies a customer-specified saving algorithm for each of the different types of financial transactions. The network-interface circuit, such as a broadband communication pathway or local area link, is configured to receive notification data, from a customer-oriented terminal, indicative of one of the plurality of customers having actively engaged in one of the types of financial transactions for automated savings participation. The computer arrangement, which would be operated on behalf of the bank or other financial institution, includes a software-programmed computer system, configured for each of the plurality of customers, to perform the following operations: the computer arrangement first accesses the customer profile data in the memory circuit; then the computer arrangement compares, in response to receiving notification data and accessing the customer profile data, the types of financial transactions being actively engaged and the customer-specified types of financial transactions and determines therefrom whether the types of financial transactions qualify for automated savings participation as specified by the customer. Based on the comparison, the computer arrangement selects a customer-specified saving algorithm as specified for the type of financial transaction, accesses and implements the customer-specified saving algorithm for the financial transaction for which notification data has been received and, therefrom, increases (e.g., by transferring from another of the customer's accounts or charging by credit) the amount of savings in the account for accumulating automated savings.

Certain aspects of the present invention can be particularly useful for a consumer or customer of a financial institution (e.g., bank) to save money based on a wide variety of transactions. Examples of these transactions include (without limitation):

The deposit of a paycheck
The deposit of other funds
ATM withdrawals
ATM deposits
Online bill pay
ACH transactions
Using a debit card
Using a credit card sponsored by the customer's financial institution For deposit transactions, one embodiment of the present invention allows a customer to sign up and indicate how certain transactions effect savings, such as effecting savings of a fixed dollar amount or a percentage of a deposit to be moved immediately into a savings (or special savings accumulation) account held by the financial institution on behalf of the customer. This approach allows the individual to choose and customize options, for example, to affect a percentage or flat dollar amount of any financial transaction into savings. In this regard, the customer is automatically saving on each identified type of financial transaction.

In response to such financial transactions, the customer's funds are transferred to a distinct simple savings vehicle such as a bank savings account or Certificate of Deposit (CD), with (conventional or customized) options for interest and withdrawal. As examples of options for interest and withdrawal, when a customer signs up and defines how certain transactions are to effect savings, the customer is informed of a savings-incentivizing feature as a clause in the contractual agreement between the customer and the financial institution managing the savings/account on behalf of the customer. The savings-incentivizing feature is activated (or not) as a default feature through which the customer is effectively default, e.g., by way of the customer's accumulated savings, in the event that the customer attempts to offset an amount from the savings account over a predetermined (agreed to) period of time, e.g., less than one year. Rather than such a default penalty feature, another implementation of the savings-incentivizing feature rewards the customer with a bonus (in the form of cash and/or prize) from the financial institution should the customer not attempt to offset an amount from the savings account over a predetermined time period.

In yet another implementation, the savings-incentivizing feature rewards the customer according to one or more penalty/reward features defined at the outset of the program based on the initial agreement between the financial institution and the customer. For many customers, this approach is perhaps the most attractive because it permits for complete customization as defined by customer-specific savings goals. For both the financial institution and the customer, such an approach permits a personalized relationship to be implemented to address the savings needs of customers as well as other possible needs.

For ATM withdrawals, another embodiment of the present invention allows the individual to sign up for transfers of a flat dollar amount or a percentage of every ATM withdrawal to be made into the savings account. This approach allows the individual to choose to move a fixed amount when withdrawing funds or have the system do this automatically. Again, the individual consumer could opt in or opt out of this aspect of the savings program and denote preferences per transaction type.

For bill pay or other types of withdrawals, the approach can combine features of a debit card with a savings aspect. The individual signs up to participate in the program based on debit card transactions, either rounding up the difference to the next whole number or moving a specified dollar amount to the savings vehicle (e.g., bank savings account). In this manner the consumer is actually moving money into a savings account when paying a bill or other transaction. The consumer could opt-in or opt-out of this part of the program as well. The program allows funds to be moved automatically based on a debit card purchase, a credit card purchase, an online bill pay transaction, any of these transactions, all of these transactions or none of these transactions.

According to various implementations, aspects of the present invention provide for a compelling savings program built around not only what people "should" do, but giving the consumers the opportunity to customize the interactions. This approach allows the consumer to choose when to save, which transactions will drive new savings, and can reward individuals who have multiple accounts.

In yet other implementations, aspects of the present invention also provide an annual bonus as an incentive (e.g., as a periodic bonus of a few percentage points on the amount saved in the program). These bonuses are paid on balances up to a threshold amount (e.g., $400 saved). In one such implementation, the money that a consumer contributes is locked up for 90 days, as if it were in a 90 day CD. This ensures that the funds are not simply shifted back into checking to pay bills. In another implementation, the above rewards are provided with a penalty for switching the funds out of savings, thereby encouraging customers to maintain and grow their savings. In related implementations, this goal is achieved without locking up the savings but rather penalizing to disincentivize.

In yet other related implementations, those with an existing bank relationship could participate by an affirmative election, and anyone who signs up for a new account of this type automatically participates. Apart from default transaction types (e.g., ATM deposits into checking), participation involves the consumer identifying each kind of transaction (deposits, withdrawals, bill pays, ACH, others) so as to provide a basis for determining whether a forthcoming transaction is to be part of the automatic savings program. If so, the consumer could indicate the type and amount of transfer (e.g., round up/flat dollar amount/percentage of the transaction) based on the type of transaction with participation starting immediately. Anytime a new product/offering is implemented by the bank, it can be added to the savings program.

According to another aspect of the present invention, the program sets specific savings goals (e.g., short term, medium term, long term) for specific wants or needs. As an example, a consumer sets a savings goal of $300 for a new PDA device for six months and works to save toward that goal. Once the goal is achieved, the consumer's sponsoring bank has the ability to recognize the achievement and, as an option, provide an additional incentive or reward. In one specific embodiment, the additional incentive or reward is randomly provided and, in another, the additional incentive or reward is provided according to certain pre-established criteria understood by the consumer as advertised by the bank or defined with the consumer when setting up the program. Examples of such pre-established criteria include business transaction goals defined for the bank at large, for a portion of the bank relating to the customer's venue and/or program participation, and/or for certain business activity related solely to the consumer.

Other aspects of the program address a real need for more savings processes, programs and savings discipline. Many individuals understand the need for regular savings methods, but few do so effectively. Certain embodiments of the present invention provide the participants the ability to save automatically and give them control over which transactions will drive savings. This aligns to another need, which is greater personalization of the banking services and greater control of the flow of funds for the consumers.

According to one embodiment of the present invention, a circuit-based network system, including for example, ATMs and general purpose computer arrangements, provides the functionality described herein. This circuit-based system receives and responds to data from an internal or external site (relative to the financial institution), oftentimes spurred by a customer transaction activity. The flexibility of the algorithms and implementations as implemented in computer-accessible databanks on behalf of the customer's financial institution, allows for a wide range of different options to be offered to the customer and implemented on the customer's behalf. In one implementation, the system configures the algorithms for automated implementation according to the agreement with the customer.

Figure 1:
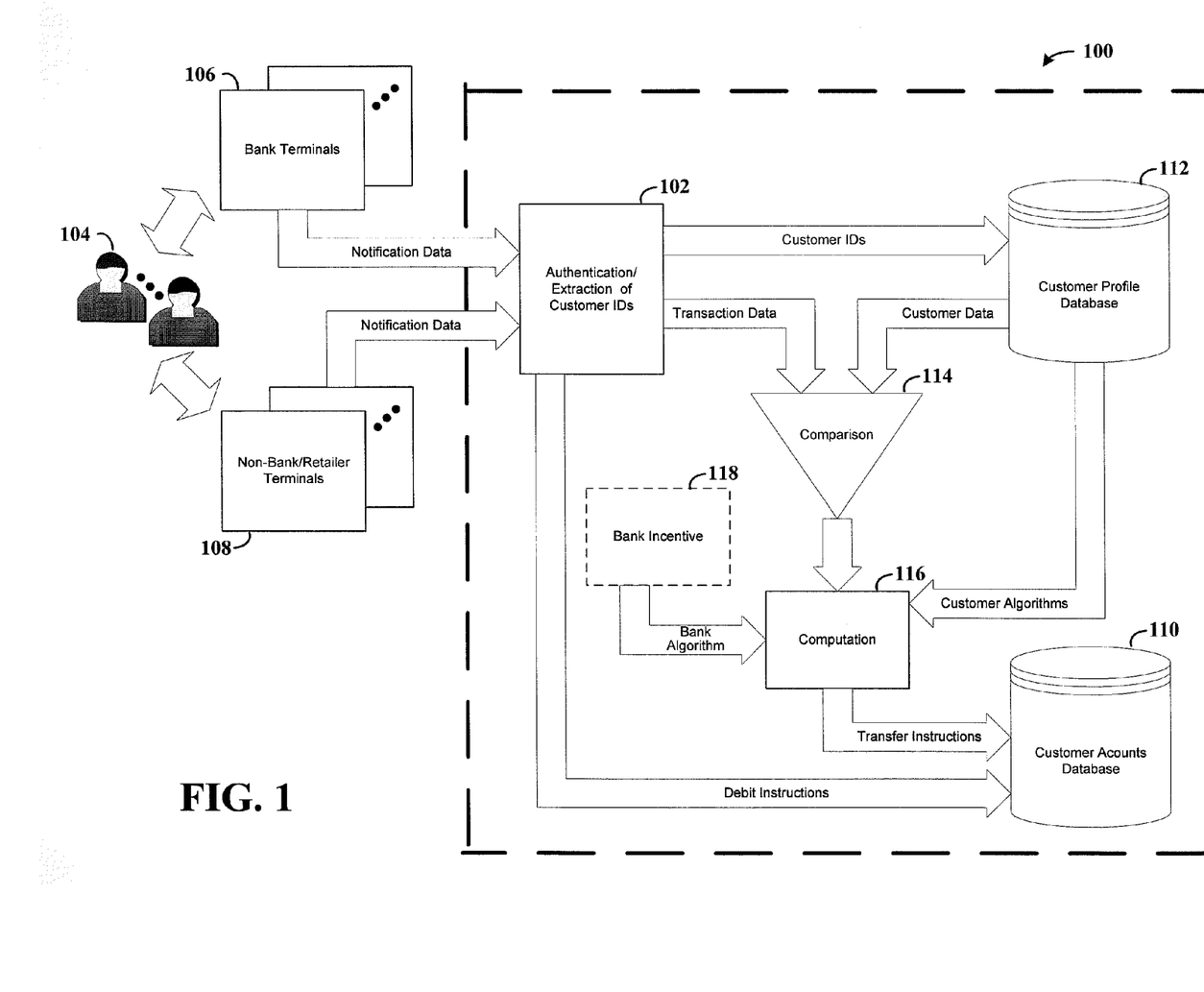
FIG. 1 shows a block diagram of a circuit-based network system, consistent with an embodiment of the present invention.

FIG. 1 is a block diagram of a circuit-based network system operable on behalf of a bank for accumulating savings on behalf of customers of the bank who are enrolled in a savings program, consistent with an embodiment of the present invention. The system 100 includes a network-interface circuit 102 that is configured to receive notification data, from customer-oriented terminals, indicative of the customers 104 of the bank having actively engaged in various types of financial transactions. The types of customer-oriented terminals vary depending on the implementation. For example, customer-oriented terminals can include bank terminals 106 and/or non-bank/retailer terminals 108. Examples of bank terminals 106 are ATMs of the bank, teller counters located at various branches of the bank, ATMs of other banks, and any other type of interface at which the customers 104 engage in transactions with a bank. Examples of non-bank/retailer terminals 108 are point of sale terminals at which the customers make purchases using checks, debit cards, credit cards, etc. that are tied to accounts held by the customers 104 at the bank. The customer-oriented terminals connect to the system 100 through networks, for which the non-bank/retailer terminals 108 could be part of a payment network or an interface specifically designed to connect directly to system 100, and for which the bank terminals 106 could be part of an ATM network.

In a specific embodiment, the network-interface circuit 102 receives the notification data and extracts a customer ID that identifies the customer who is engaged in the financial transaction. In one implementation, the network-interface circuit 102 authenticates/approves the financial transaction and sends a debit instruction to customer accounts database 110 to instruct the customer's account to be debited by the amount of the approved transaction. The customer accounts database 110 contains information regarding the accounts held by the customers 104 at the bank (e.g., checking and savings accounts) and also contains information regarding accounts for accumulating savings on behalf of the customers of the bank who are enrolled in the saving program.

The network-interface circuit 102 provides the extracted customer ID to customer profile database 112, which contains various customer profile data concerning the customers of the bank who are enrolled in the saving program. The customer profile data in the customer profile database 112 includes, for each customer enrolled in the saving program, data that identifies an account for accumulating automated savings, data that identifies customer-specified types of financial transactions for automated savings participation, and data that identifies a customer-specified saving algorithm for each of the different types of financial transactions. Each of the customers enrolled in the savings program selects the types of transactions that will trigger participation in the savings program. When the customer engages in one of the specified transactions, the amount in the customer's account for accumulating automated savings will be increased in the manner specified by the customer. For example, the customer can specify a particular savings algorithm for each of the different types of financial transactions that determines how much the amount in the customer's account for accumulating automated savings is increased in response to the customer engaging in a particular type of transaction.

In response to the customer ID, the data in the customer profile database 112 that indicates which types of transactions that the customer, who is engaged in the financial transaction represented by the received notification data, has selected for automated savings participation is provided to comparison module 114. The comparison module 114 determines whether the transaction being actively engaged in by the consumer qualifies for automated savings participation by comparing the type of the actively engaged in transaction to the types of transactions selected by the customer for automated savings participation. For example, if the actively engaged in transaction is a purchase made by the customer using a debit card, the comparison module 114 would determine that the purchase triggers participation in the savings program if the customer's profile data indicates that the customer's selected types of transactions for automated savings participation include debit card purchases. In one implementation, the comparison module 114 compares the type of the actively engaged in transaction to the types of transactions that can be selected by the customers for automated savings participation. If the actively engaged in transaction is of a type that cannot be elected by the customers for participation in the savings program, then further analysis by the comparison module is unnecessary because the type of transaction being actively engaged in by the customer is not eligible for participation in the savings program.

The comparison module 114 provides data to a computation module 116 when the comparison module 114 determines that the actively engaged in transaction is of a type that the customer has selected for automated savings participation. The computation module 116 determines the amount by which the customer's savings, in the account for accumulating automated savings, is increased in response to the actively engaged in transaction. The computation module 116 accesses the customer-specified saving algorithm, in customer profile database 112, for the type of the actively engaged in transaction and the computation module 116 uses the accessed algorithm and the transaction data (e.g., the amount of the engaged in transaction) to calculate a savings amount. The computation module 116 then provides transfer instruction data to the customer accounts database 110 to affect an increase in the amount of savings in the customer's account for accumulating automated savings by the calculated savings amount (e.g., by transferring from another of the customer's accounts or charging by credit).

In one implementation, the system 100 further includes a bank incentive module 118 that is configured to provide the customers incentives to participate in the automated savings program. The bank incentive module 118 allows the bank to make additional contributions to the customers' accounts for accumulating automated savings (e.g., as a periodic bonus of a few percentage points of the amount saved by the customer as a result of the savings program). The bank incentive module 118 provides a bank incentive algorithm to the computation module 116, which calculates the bonus amount to be added to the customer's account for accumulating automated savings.

Embodiments of the present invention are also directed toward a computer readable medium programmed with instructions that when executed by a processor perform the various steps or algorithms disclosed herein. These algorithms include those disclosed in the figures and related discussion as well as variations thereof.

Figure 2:
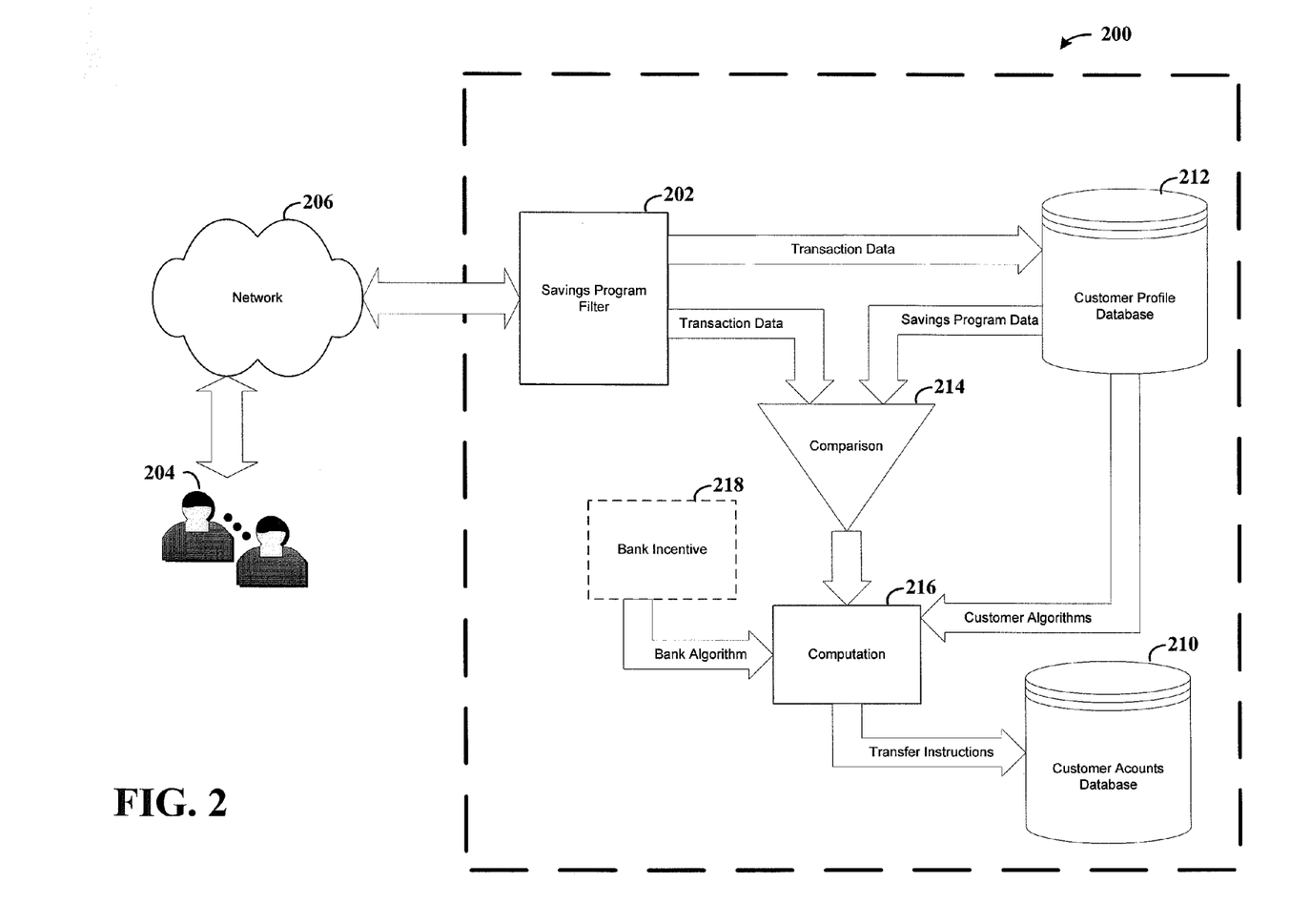
FIG. 2 shows a block diagram of a circuit-based network system, consistent with another embodiment of the present invention.

FIG. 2 is a block diagram of a circuit-based network system operable on behalf of a bank for accumulating savings on behalf of customers of the bank who are enrolled in a savings program, consistent with another embodiment of the present invention. The system 200 receives transaction data indicating that a customer of the bank has engaged in a transaction using an account held at the bank, using a network-appropriate terminal (such as 106 or 108 from FIG. 1). In one implementation, the transaction data is received over a network 206. The network 206 can be any of a variety of public/private types including, e.g., mobile-telephone networks, the Internet or an arrangement of such communication interfaces that permit for conventional, custom and/or customer-specific online banking and other types of financial transactions. The system 200 includes a savings program filter module 202 that extracts certain information from the transaction data, such as the type of the transaction, the ID of the customer who engaged in the transaction and/or the type of account used for the transaction. The information that is extracted by the savings program filter module 202 is used by the system 200 to initially determine whether the transaction engaged in by the customer is eligible for participation in the savings program.

The system 200 includes a comparison module 214 that compares the information extracted by the savings program filter module 202 to data stored in customer profile database 212, which corresponds to customer profile database 112 of FIG. 1. The savings program filter module 202 and the comparison module 214 perform one or more initial filtering steps to determine whether the transaction is eligible for participation in the savings program. As a first example, the comparison module 214 can compare the customer ID of the customer engaged in the transaction to the IDs of the customers who are enrolled in the savings program. As a second example, the comparison module 214 can compare the type of account involved in the transaction to the types of accounts that the bank has selected as being eligible for participation in the savings program. As a third example, the comparison module 214 can compare the type of the engaged in transaction to the types of transactions that the bank has selected as being eligible for participation in the savings program. If any of the initial filtering steps performed by the savings program filter 202 and the comparison module 214 indicate that the engaged in transaction is not eligible for participation in the savings program, then further analysis by the comparison module 214 is unnecessary.

The system 200 further includes a computation module 216, which corresponds to computation module 116 of FIG. 1, a customer accounts database 210, which corresponds to customer accounts database 110 of FIG. 1, and a bank incentive module 218, which corresponds to bank incentive module 118 of FIG. 1.

Figure 3:
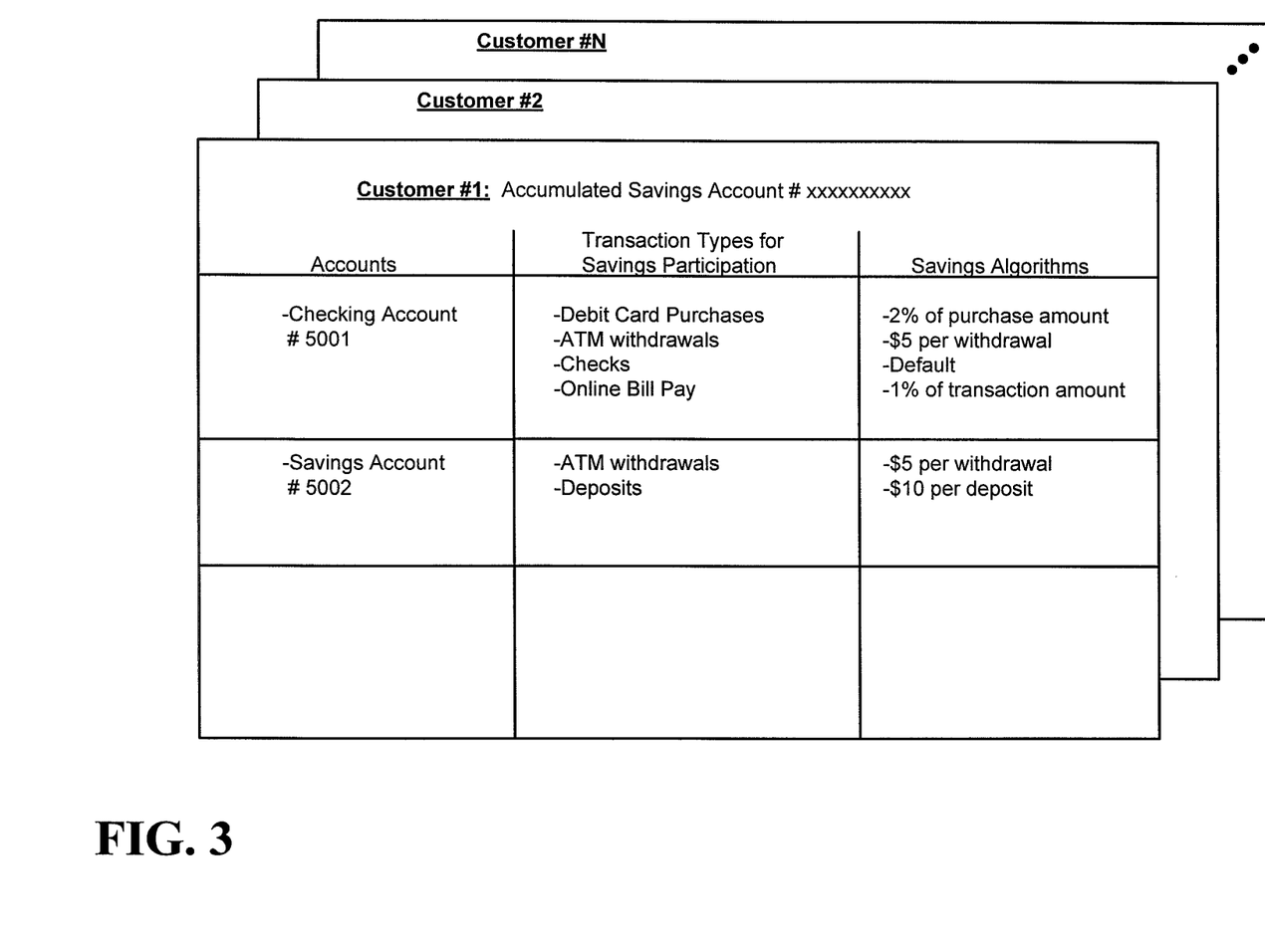
FIG. 3 shows a block diagram of customer profile data used with a savings program, consistent with an embodiment of the present invention.

FIG. 3 shows a block diagram of customer profile data used with a savings program, consistent with an embodiment of the present invention. The customer profile data can be stored, for example, in the customer profile database 112 of FIG. 1. The customer profile data includes a profile for each customer of the bank who is enrolled in the savings program.

The customer profile for each customer includes data, such as an account number, that identifies the customer's account for accumulating savings. When a customer enrolls in the savings program, the customer selects which of the customer's accounts at the bank will participate in the savings program. For example, customer #1 in FIG. 3 has selected checking account number 5001 and savings account number 5002 for participation in the savings program. The customer then selects the type of transactions for each of the selected accounts that will trigger participation in the savings program. For example, customer #1 has selected that debit card purchases, ATM withdrawals, checks and online bill pay transactions associated with checking account number 5001 will trigger participation in the savings program, and that ATM withdrawals and deposits associated with savings account number 5002 will trigger participation in the savings program.

The customer also selects a particular saving algorithm that is used to determine the amount that is transferred to the customer's accumulated savings account when the customer engages in one of the selected types of transactions using one of the selected types of accounts. For example, customer #1 has selected an algorithm that results in 2% of the amount of every debit card purchase made using checking account #5001 being transferred to the customer's accumulated savings account. In one implementation, the customer can select a different saving algorithm for each of the selected types of transactions for each of the selected accounts. The customer could also select a single savings algorithm (e.g., 1% of the transaction amount) for each of the selected types of transactions for each of the selected accounts. In a further implementation, the bank can assign a default saving algorithm (e.g., 1% of the transaction amount) to each of the selected types of transactions for each of the selected accounts for which the customer does not select a savings algorithm. For example, a default saving algorithm has been assigned for customer #1 for checks drafted on checking account 5001.

The circuit-implemented system can include one or more of: discrete logic circuitry, programmable logic arrays, specialized processors or general purpose processor specifically programmed. Combinations of these and other circuit elements are also possible and within the scope of various embodiments of the present invention. For example, systems consistent with the aspects shown in FIGS. 1 and 2 could be implemented in a variety of circuit-based forms, such as through use of data processing circuit modules. More specifically, such systems are exemplified by implementation in high-speed programmable computer/processor circuits that execute stored instructions to provide operations corresponding to the various blocks of FIG. 1. Alternatively, such a computer/processor could be implemented in combination with discrete and or semi-programmable circuitry, (e.g., as Field-Programmable Gate Arrays, Programmable Logic Devices/Arrays). Also various ones of the illustrated blocks, and those functions discussed in text, can be implemented using integrated and nonintegrated approaches, e.g., with certain of the blocks located remotely and/or operated disparately relative to the other blocks.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention, including that set forth in the following claims.

What is claimed is:

1. A computer-based method for implementation by a computer on behalf of a financial institution, the method comprising:
    storing in a memory circuit, for each of a plurality of customers, customer profile data that identifies a checking or savings account for accumulating automated savings, that identifies customer-specified types of financial transactions for automated savings participation, and that identifies a customer-specified saving algorithm for each of the types of financial transactions and customer-specific savings goals;
    receiving, at an interface circuit, notification data indicative of each one of the plurality of customers having actively engaged in at least one of the types of financial transactions for automated savings participation; and
    for each one of the plurality of customers, executing instructions at a computer processor to perform the steps of:
        accessing the customer profile data in the memory circuit;
        comparing, in response to the steps of receiving notification data and accessing the customer profile data, said one of the types of financial transactions being actively engaged and the customer-specified types of financial transactions and determining therefrom whether said one of the types of financial transactions qualifies for automated savings participation,
        based upon the determining,
            selecting a customer-specified saving algorithm as specified for the type of financial transaction,
            accessing and implementing the customer-specified saving algorithm for the financial transaction for which notification data has been received and, therefrom,
            increasing the amount of savings in the account for accumulating automated savings;
            placing a lock on withdrawals from the account, for a set number of days and for the increased amount of savings;
            detecting achievement of a customer-specific savings goal; and
            providing, in response to detecting achievement of a customer-specific savings goal, a reward.

2. The method of claim 1, wherein the notification data is received from a retailer terminal at which the customer initiates a business transaction.

3. The method of claim 1, wherein the notification data is received from a terminal connected to the computer through a broadband network, the terminal being used as part of a business transaction involving the customer.

4. The method of claim 1, further including the steps of reporting the increased amount of savings in the account and separately reporting an accumulated automated savings resulting from the step of increasing the amount of savings in the account for accumulating automated savings.

5. The method of claim 1, wherein the notification data is received from a terminal connected to the computer through a broadband network and is received in response to a deposit of funds other than funds identifiable as a paycheck deposit.

6. The method of claim 1, wherein the notification data is received from a terminal connected to the computer through a communications network and is received in response to a paycheck deposit.

7. The method of claim 1, wherein the notification data is received from a terminal connected to the computer through a communications network and is received in response to an ATM transaction.

8. The method of claim 1, wherein the notification data is received from a terminal connected to the computer through a communications network and is received in response to an online bill pay transaction.

9. The method of claim 1, wherein the notification data is received from a terminal connected to the computer through a broadband communications network and is received in response to an online bill pay transaction.

10. The method of claim 1, wherein the notification data is received from a terminal connected to the computer through a communications network and is received in response to a debit card transaction.

11. The method of claim 1, wherein the notification data is received from a terminal connected to the computer through a communications network and is received in response to a credit card transaction.

12. The method of claim 11, wherein the transaction involves a card sponsored by the customer's financial institution.

13. The method of claim 11, wherein the transaction involves a card sponsored by a financial institution other than the customer's financial institution.

14. The method of claim 1, wherein the notification data is received from a retail terminal connected to the computer through a communications network and is received in response to a purchase transaction initiated by the customer.

15. The method of claim 1, further including the step of storing, for said one of the plurality of customers, a first customer-specified saving algorithm for one of the types of financial transactions, and another customer-specified saving algorithm for another of the types of financial transactions.

16. The method of claim 1, further including the step of storing, for said one of the plurality of customers, a common customer-specified saving algorithm for each of at least two types of financial transactions.

17. The method of claim 1, further including the step of storing, for said one of the plurality of customers, a first saving algorithm and a second saving algorithm for the same type of financial transaction, wherein the customer profile data specifies use of the first customer-specified saving algorithm for a first customer-account condition and the second saving algorithm for another condition.

18. The method of claim 1, further including increasing the amount of savings in the account for accumulating automated savings as a function of both the customer-specified saving algorithm and another incentive program common to a plurality of the customers, wherein the lock on the account expires prior to transferring the savings corresponding to the customer-specified saving algorithm and the another incentive program out of the account.

19. A non-transitory data-storage medium containing computer-executable data that, in response to being executed by a computer circuit, causes the computer circuit to execute a method comprising the steps of:

storing in a memory circuit, for each of a plurality of customers, customer profile data that identifies an account for accumulating automated savings, that identifies customer-specified types of financial transactions for automated savings participation, and that identifies a customer-specified saving algorithm for each of the types of financial transactions;

receiving notification data indicative of one of the plurality of customers having actively engaged in one of the types of financial transactions for automated savings participation;

for said one of the plurality of customers, accessing the customer profile data in the memory circuit;

comparing, in response to the steps of receiving notification data and accessing the customer profile data, said one of the types of financial transactions being actively engaged and the customer-specified types of financial transactions and determining therefrom whether said one of the types of financial transactions qualifies for automated savings participation, based upon the comparison, selecting a customer-specified saving algorithm as specified for the type of financial transaction, accessing and implementing the customer-specified saving algorithm for the financial transaction for which notification data has been received and, therefrom, increasing the amount of savings in the account for accumulating automated savings, wherein the increased amount of savings includes funds from a rewards program, and charging a penalty, in response to a subsequent transfer of the funds corresponding to the rewards program out of the account for accumulating automated savings.

20. A computer-based circuit operable on behalf of a financial institution for accumulating savings on behalf of an individual, the computer-based circuit comprising:

a memory circuit storing, for each of a plurality of customers, customer profile data that identifies an account for accumulating automated savings, that identifies customer-specified types of financial transactions for automated savings participation, and that identifies a customer-specified saving algorithm for each of the types of financial transactions;

a network-interface circuit configured to receive notification data, from a customer-oriented terminal, indicative of one of the plurality of customers having actively engaged in one of the types of financial transactions for automated savings participation;

a computer arrangement, including at least one software-programmed computer, configured for said one of the plurality of customers, to access the customer profile data in the memory circuit;

compare, in response to the steps of receiving notification data and accessing the customer profile data, said one of the types of financial transactions being actively engaged and the customer-specified types of financial transactions and determine therefrom whether said one of the types of financial transactions qualifies for automated savings participation, based upon the comparison, select a customer-specified saving algorithm as specified for the type of financial transaction, access and implement the customer-specified saving algorithm for the financial transaction for which notification data has been received and, therefrom, increase the amount of savings in the account for accumulating automated savings, wherein the increased amount of savings includes funds from a rewards program, determine that funds withdrawn from the account for accumulating automated savings correspond to the funds for a rewards program, charge a penalty, in response to determining the withdrawn funds correspond to the funds for the rewards program, and not charge the penalty for withdrawals that do not correspond to funds for the rewards program.

21. The computer-based circuit of claim 20, wherein the notification data is received from a retailer terminal at which the customer initiates a business transaction.

22. The computer-based circuit of claim 20, wherein the notification data is received from a terminal connected to the computer through a broadband network, the terminal being used as part of a business transaction involving the customer.

23. The computer-based circuit of claim 20, further including the steps of reporting the increased amount of savings in the account and separately reporting an accumulated automated savings resulting from the step of increasing the amount of savings in the account for accumulating automated savings.

24. The computer-based circuit of claim 20, wherein the notification data is received from a terminal connected to the computer through a broadband network and is received in response to a deposit of funds other than funds identifiable as a paycheck deposit.

25. The computer-based circuit of claim 20, wherein the notification data is received from a terminal connected to the computer through a communications network and is received in response to one or more of a paycheck deposit; an ATM transaction; an online bill pay transaction; and a credit or debit card transaction.

26. The computer-based circuit of claim 20, wherein the notification data is received from a terminal connected to the computer through a communications network and is received in response to a credit or debit card transaction, wherein the transaction involves a card sponsored by the customer's financial institution.

27. The computer-based circuit of claim 20, wherein the notification data is received from a terminal connected to the computer through a communications network and is received in response to a credit or debit card transaction, wherein the transaction involves a card sponsored by a financial institution other than the customer's financial institution.

28. The computer-based circuit of claim 20, wherein the notification data is received from a retail terminal connected to the computer through a communications network and is received in response to a purchase transaction initiated by the customer.

29. The computer-based circuit of claim 20, wherein the memory circuit further stores for said one of the plurality of customers, a first customer-specified saving algorithm for one of the types of financial transactions, and another customer-specified saving algorithm for another of the types of financial transactions.

30. The computer-based circuit of claim 20, wherein the memory circuit further stores for said one of the plurality of customers, a common customer-specified saving algorithm for each of at least two different types of financial transactions.

31. The computer-based circuit of claim 20, wherein the memory circuit further stores for said one of the plurality of customers, a first saving algorithm and a second saving algorithm for the same type of financial transaction, wherein the customer profile data specifies use of the first customer-specified saving algorithm for a first customer-account condition and the second saving algorithm for another condition.

32. The computer-based circuit of claim 20, wherein the computer arrangement is further configured to increase the amount of savings in the account for accumulating automated savings as a function of both the customer-specified saving algorithm and another incentive program common to a plurality of the customers.

* * * * *